(12) United States Patent
Erickson

(10) Patent No.: US 6,854,747 B2
(45) Date of Patent: Feb. 15, 2005

(54) COVER ASSEMBLY FOR HOSPITAL CARTS

(76) Inventor: Tomiko Erickson, 10100 E. Calusa Club Dr., Miami, FL (US) 33186

( * ) Notice: Subject to any disclaimer, the term of this patent is extended or adjusted under 35 U.S.C. 154(b) by 0 days.

(21) Appl. No.: 09/886,660

(22) Filed: Jun. 21, 2001

(65) Prior Publication Data

US 2002/0038941 A1 Apr. 4, 2002

Related U.S. Application Data

(60) Provisional application No. 60/237,493, filed on Oct. 4, 2000.

(51) Int. Cl.$^7$ .............................. B62B 3/00; B65D 65/10
(52) U.S. Cl. ...................................... 280/79.3; 150/154
(58) Field of Search ........................... 280/47.34, 47.35, 280/79.11, 79.2, 79.3; 150/154, 158, 165, 166

(56) References Cited

U.S. PATENT DOCUMENTS

| | | | | |
|---|---|---|---|---|
| 3,729,038 A | * | 4/1973 | Ekeson ........................ 190/110 |
| 4,350,274 A | * | 9/1982 | Morgan ....................... 224/610 |
| 4,830,037 A | | 5/1989 | Held |
| 4,948,154 A | * | 8/1990 | Guggenheim ............... 280/79.3 |
| 4,954,384 A | * | 9/1990 | Hartwell ...................... 150/154 |
| 5,046,860 A | * | 9/1991 | Brennan ....................... 383/38 |
| 5,195,778 A | * | 3/1993 | Dismuke ..................... 150/166 |
| 5,310,235 A | | 5/1994 | Seymour et al. |
| 5,326,117 A | | 7/1994 | Cook |
| 5,388,881 A | | 2/1995 | Spencer et al. |
| 5,474,185 A | * | 12/1995 | Franke ........................ 150/165 |
| 5,761,853 A | * | 6/1998 | Trosper et al. .............. 150/154 |
| 5,782,360 A | * | 7/1998 | Markson ..................... 150/154 |
| 5,826,714 A | * | 10/1998 | Martin ........................ 206/232 |
| 5,908,681 A | * | 6/1999 | Foster ......................... 150/158 |
| 6,068,325 A | | 5/2000 | Hughes |
| 6,196,287 B1 | * | 3/2001 | Haberkorn .................. 150/154 |

OTHER PUBLICATIONS

METRO "1999 Healthcare Catalog".

* cited by examiner

*Primary Examiner*—Frank Vanaman
(74) *Attorney, Agent, or Firm*—Malloy & Malloy, P.A.

(57) ABSTRACT

A protective cover assembly for a cart and it's contents of the type used in hospitals and like medical facilities for the temporary storage and delivery of a plurality of items which should be maintained in a substantially sterile environment. The cover assembly comprises an enclosure formed from a flexible, preferably hypo-allergenic material dimensioned to receive substantially the entire cart therein. A plurality of reinforced portions are secured to the enclosure and are structured to prevent rupture or other physical damage thereto. A storage assembly comprises one or more compartments including at least one interior pocket disposed and structured to isolate the contents thereof.

18 Claims, 2 Drawing Sheets

COVER ASSEMBLY FOR HOSPITAL CARTS

CLAIM OF PRIORITY

The present application is based on and a claim to priority is made under 35 U.S.C. Section 119(e) to provisional patent application currently pending in the U.S. Patent and Trademark Office having Ser. No. 60/237,493 and a filing date of Oct. 4, 2000.

BACKGROUND OF THE INVENTION

1. Field of the Invention

This invention relates to a protective cover assembly primarily designed to enclosed a mobile delivery cart of the type used for the distribution of a variety of items, at least some of which should be maintained in an at least partially sterile environment, such as items used in hospitals or like medical facilities. The cover assembly includes an enclosure formed of flexible, preferably hypo-allergenic material which, when expanded into an operative position, substantially surrounds and encloses the cart as well as its contents, thereby facilitating the maintenance of the preferred sterile environment.

2. Description of the Related Art

Manually powered or propelled carts, hand trucks, bins, and the like are widely known and used in a variety of both commercial and domestic applications and typically involve the temporary storage and transport of a variety of items from one location to another in the same physical facility. Carts of the type referred to may take a variety of structural designs and configurations depending upon their intended use and/or the items which they are intended to contain. Such structural variations include carts designed to carry open top bins that are primarily designed to contain a plurality of loosely stored items. Examples may include grocery carts and carts used in hotels that carry a number of bins holding soap bars, containers of shampoo, etc. More structurally complex carts exist, however, which include a plurality of shelves, open or closed compartments and/or segregated areas, and are therefore, designed to contain a plurality of products or items of the same kind or class, in at least a minimally segregated manner. The size of such carts, bins, hand trucks, etc. can also vary from relatively small push carts, of the type found in grocery stores and like retail establishments, to much larger carts, which often times approximate the size of the person propelling the cart and which are primarily used in industrial or other commercial environments.

One area in which mobile delivery carts are used extensively is in the medical field, wherein such carts are used to deliver a large variety of items throughout hospitals or other medical and patient care facilities. Such items include, but are not limited to, surgical gowns, scrub apparel, sheets and pillow cases as well as like bedding materials, surgical masks, shoe covers, hair covers, and any of a large variety of other medical products or devices necessary for proper patient care. In the hospital setting especially, it is important that at least some of these products be sterile and totally free of germs. Thus, certain ones of these products are pre-packaged in a hermetically sealed or otherwise sterile wrapping. Still others of these products, however, are not pre-packaged, but should still be maintained in a substantially sterile environment. Preferably, a substantially sterile environment should also be maintained for all of these items as they are transported from a supply station to their respective destinations within a hospital or similar patient care facility. During the distribution and/or delivery process, items of the type set forth above are typically stored on mobile delivery carts as they are transported along a predetermined delivery route within and distributed throughout the physical facilities of the hospital or like institution.

During the time it takes to deliver the variety of items or products contained on such delivery carts, it is desirable to maintain, at least as much as practical, a substantially sterile environment for the storage of such items as they travel along the aforementioned delivery route. This is particularly true in hospitals and the like where some germs, bacteria and infectious diseases may be carried in and transmitted by contact ith the air. In that delivery carts of the type used in hospitals normally are "open", to the extent that one or more sides of the cart comprise a plurality of openings to facilitate ready access to the products being delivered, there is a recognized need for some type of cover dimensioned and configured to somewhat protect the delivery cart as well as the contents therein. It would be beneficial if a cover were developed that could effectively isolate the contents of the cart and, as much as possible, to maintain a substantially sterile environment on the interior thereof, regardless of whether the contents of the cart are pre-packaged or not. In addition, it would be highly beneficial if a cover were developed that were adequately structured or reinforced to the extent of significantly reducing the possibility that such a cover will be torn or ruptured which is quite possible as deliveries are made, and which would, thereby compromise the sterile environment under the cover, i.e., the interior portions of the cart and its contents. It would also be highly beneficial if a cover of the type referred to above were developed that could further aid in the maintenance of a substantially sterile environment by being formed of a flexible, strong, hypo-allergenic material which, in addition, is capable of being selectively oriented in either a collapsed, stored position or an extended, operative position wherein the operative position includes a hollow interior dimensioned to substantially cover the top and exposed sides or faces of the cart. Of course, any such cover should enable a person to easily access the contents of the cart, albeit in somewhat of a restricted manner, so as to reduce exposure of the interior portions of the cart under the cover, as well as its contents to the surrounding environment.

SUMMARY OF THE INVENTION

The present invention is intended to address these and other needs which remain in the art, and is directed towards a cover assembly of the type designed to overlie and substantially enclose a delivery cart or like structure, such that the art and the contents thereof are enclosed and protected. The cover assembly of the present invention is made from a flexible, yet relatively strong and substantially protective material and in one embodiment, to be described in greater detailed hereinafter, is made from a hypo-allergenic material so as to maintain an at least partially sterile environment on the interior of the enclosure in which the cart is positioned. The hypo-allergenic material from which the enclosure of the cart assembly of the present invention is formed may be of the type commercially available under the trademark STAPH-CHEK,™ registered in the U.S. Patent and Tradmark Office, namely, Reg. No. 802,786, and manufactured by Herculite Products, Inc., a corporation of New York with offices in New York City and possibly in Newark, N.J., as well. Naturally, equivalent hypo-allergenic materials can be utilized and are applicable for forming the enclosure of the subject cover assembly, particularly when the delivery cart of the type referred to is used in hospitals or like medical facilities for the delivery of a plurality of different products or items, at least some of which are intended to be maintained in an at least partially sterile environment. However, it is emphasized that the cover assembly of the present invention does not have to be formed of a hypo-allergenic material, as such an embodiment would still be considered to fall within the spirit and scope of the present invention.

As set forth above, in hospitals or other patient care facilities, a variety of items including but not limited to, patient gowns, patient bedding, surgical gowns and other scrub apparel including hair covers, surgical masks, shoe covers, etc. are all maintained in a sterile condition until such items are delivered to their point of use, un-packaged and applied as intended. This is particularly true with surgical gowns or like surgical and scrub apparel used in operating rooms, intensive care units, isolation wards, etc. The present invention facilitates the maintenance of these and other such medical items or products in an at least partially or substantially sterile environment during their delivery, by providing a cover assembly comprising an enclosure, which is dimensioned and configured to substantially surround and enclose the delivery cart when the enclosure is in its expanded, operative position.

More specifically, the enclosure comprises a top disposed in overlying relation to an upper portion of the cart and a sidewall structure secured to the top and depending downwardly therefrom into overlying, covering relation to the various sides of the cart and in substantially surrounding relation thereto.

The sidewall structure includes at least one access opening that is structured and disposed to substantially correspond in dimension and configuration to one side of the cart and/or to an area of the cart so as to provide access to the contents thereof. The cover assembly additionally comprises in the preferred embodiment, a closure structure that is structured for selective positioning between an open position and a closed position relative to the access opening, in order that the cart may be almost entirely covered on the interior of the enclosure, thereby facilitating the maintenance of the aforementioned, desired sterile environment. The closure structure preferably comprises a drape of flexible material connected to the sidewall structure and, in one embodiment, secured to extend downwardly from either the top of the enclosure or an upper portion of the sidewall structure in overlying, covering relation to the access opening and to the area of the cart which is designed to provide access to the contents thereof. The access opening is preferably dimensioned to provide access to all of the various items or contents of the cart by selectively positioning the closure structure in the open position. Also, as the closure structure is preferably formed from a flexible material, the closure structure can be selectively positioned in a partially open position which allows exposure of only certain portions of the cart and access sufficient to only one of the contents of the cart, as required.

The cover assembly of the present invention preferably includes a reinforcement assembly. More specifically, the reinforcement assembly comprises a plurality of reinforced portions mounted on various portions of the enclosure. The reinforced portions are disposed in spaced apart, strategically located positions on the enclosure so as to provide protection against physical damage, including tearing or rupture, such as when the enclosure inadvertently engages wall surfaces, doors, or the like. The various reinforced portions are also disposed on the enclosure to prevent similar damage when the enclosure is being manipulated during mounting on the cart and/or when the closure structure is being moved to provide access to the interior of the cart. The reinforced portions may be generally defined as thickened material portions, ideally comprising multi-layered structures of material, which provide resistance to physical damage to the enclosure, as set forth above. Such reinforced portions may include, but are not limited to, surrounding peripheral seams located at the junction of the top and sidewall structure of the enclosure, as well as a plurality of corner pads strategically located so as to reinforce certain areas of the enclosure of the cover assembly which undergo stress or unusual forces when the enclosure is positioned in its operative position.

The cover assembly of the present invention preferably also comprises a storage assembly, including one or more pockets, located at predetermined positions, ideally located both on the exterior and interior of the cart and which are specifically structured for the containment of various items. More specifically, the storage assembly of the present invention includes at least a first pocket or compartment disposed within the hollow interior of the enclosure in a location which is readily accessible. This first pocket or compartment is also preferably formed of a hypo-allergenic material, as discussed above, and is dimensioned and configured to removably contain predetermined items or specific contents, which are best maintained in as sterile an environment as possible, during the delivery procedure. Accordingly, this first pocket or compartment serves to isolate its contents from the cart, also disposed on the interior of the enclosure, and from the exterior of the enclosure until it is delivered to its intended destination. The storage assembly may also include one or more additional pockets or compartments mounted on the exterior surface of the sidewall structure which are specifically structured to removably contain a variety of other products, items or contents, as desired.

These and other features and advantages of the present invention will become more clear when the drawings, as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 1 is a perspective view of a cover assembly according to the present invention disposed in overlying, covering relation to a mobile delivery cart or like structure.

Like reference numerals refer to like parts throughout the several views of the drawings.

DETAILED DESCRIPTION OF THE PREFERRED EMBODIMENT

Figure 2:
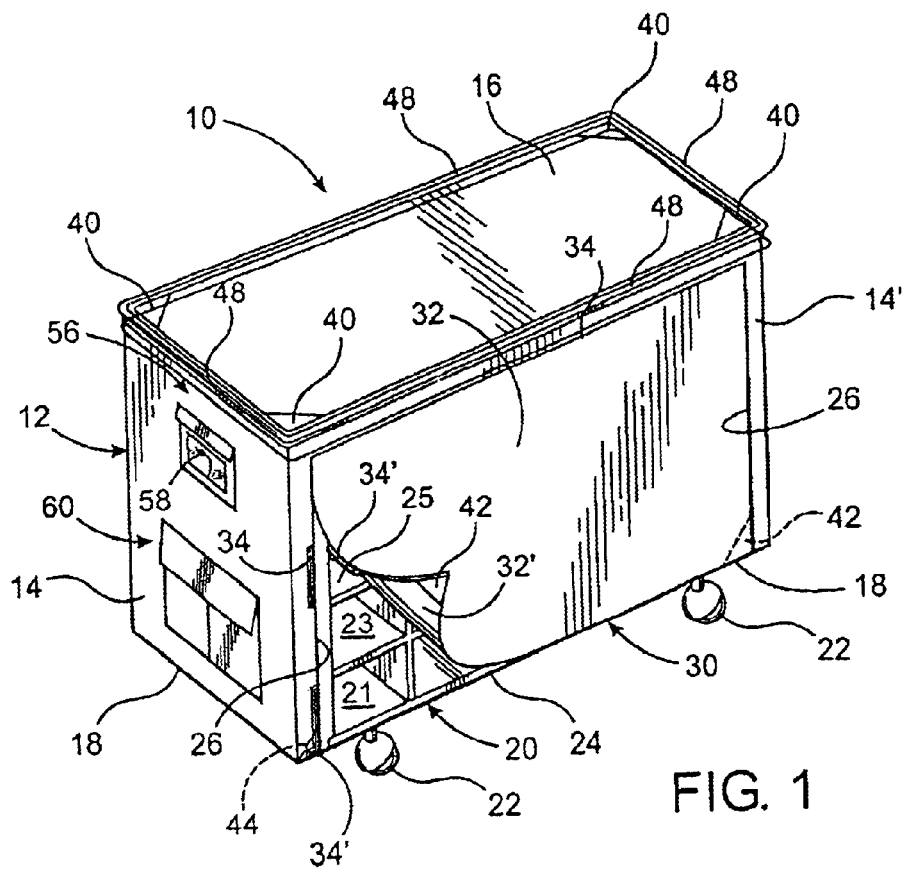
FIG. 2 is a detailed view in partial cutaway of one portion of the embodiment of FIG. 1.
Figure 3:
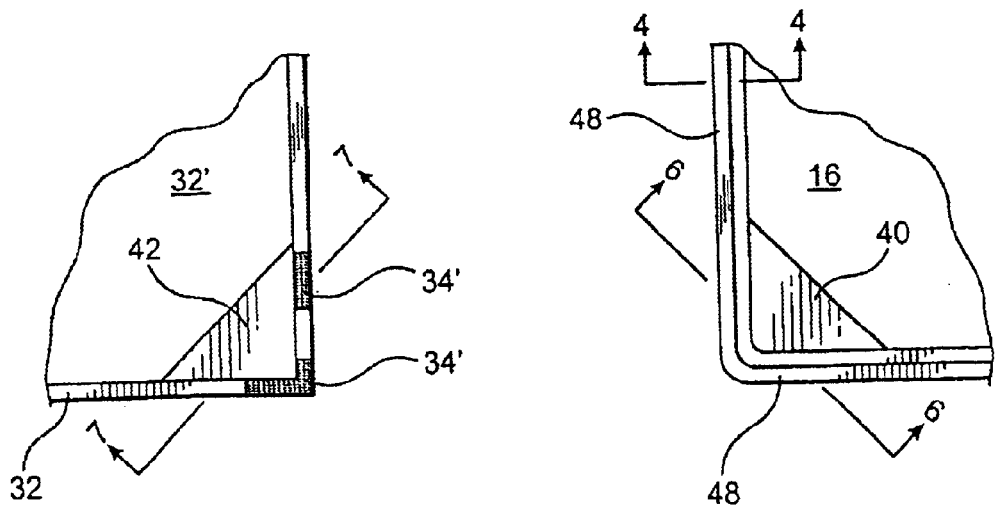
FIG. 3 is a detailed view in partial cutaway of another portion of the structure of the embodiment of FIG. 1.
Figure 4:
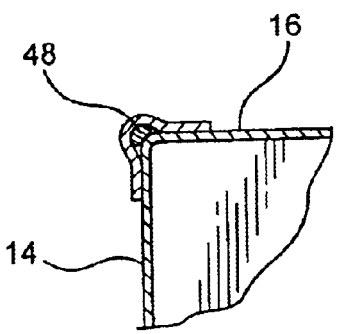
FIG. 4 is a sectional view taken along line 4—4 of FIG. 3.

As shown in the accompanying drawings, the present invention relates to a cover assembly such as that generally indicated as 10 in FIG. 1. The cover assembly 10 includes an enclosure generally indicated as 12 comprising a sidewall 14 disposed in substantially surrounding relation so as to form a hollow interior of the enclosure 12. Further, the enclosure 12 includes a top 16 secured to the sidewall 14 such that the sidewall 14 extends in a downwardly depending relation to the top 16. The sidewall 14 may include a plurality of individual panels or sides or a alternatively, may include a continuous structure of sufficient dimension to overlie and cover substantially the entire outer portion or plurality of sides of a mobile cart generally indicated as 20.

The enclosure 12 is preferably formed from a flexible and yet high strength protective material, which is ideally also waterproof, that is capable of being selectively disposed in either a collapsed, substantially folded position (not shown) or an outwardly expanded, operative position as shown in FIG. 1. When in the operative position of FIG. 1, the enclosure 12 includes a hollow interior that is preferably dimensioned and configured to receive and entirely enclose the mobile cart 20. In order to facilitate movement or travel of the cart 20, the bottom of the enclosure 12, more specifically defined by the bottom peripheral edge of the sidewall 14, remains open as at 18, so as to allow the wheel or castor assembly 22 secured to a base 20 of the cart to pass therethrough into movable supported engagement with the floor or like surface over which the cart travels.

The enclosure 12 of the cover assembly 10 further includes at least one access opening 26 formed in the sidewall 14 and disposed in overlying, accessible relation to the hollow interior of the enclosure 12. Preferably, the cover assembly includes only one access opening disposed in corresponding alignment with at least one side of the cart 20. More specifically, the access opening 26 is ideally dimensioned and configured to be substantially equivalent or at least to correspond to the dimension and configuration of one side of the cart 20, as shown in FIG. 1, which facilitates access to various portions of the cart 20, such as compartments or shelves 21, 23, 25 etc., as well as the contents therein. It should be noted that the size and overall configuration of the access opening 26 may vary dependent on the size and configuration of the cart 20, and more particularly, on the arrangement or disposition of the various compartments 21, 23, 25, etc. and/or other facilities included on the cart 20 and utilized to store and transport the various items or contents thereof.

As set forth above, one feature of the present invention is the at least partial isolation of the hollow interior of the enclosure 12 in order maintain a substantially sterile environment therein for the various items or contents separately stored on cart 20 as they are being delivered. Therefore, the cover assembly 10 of the present invention includes a closure structure, generally indicated as 30, preferably in the form of a flexible material drape 32, which may have a variety of configurations but which is specifically dimensioned and configured to be selectively disposed in covering relation to the access opening 26. Preferably, the drape 32 is secured by a connecting seam or junction 34 to the top 16 or to the sidewall 14 and hangs downwardly therefrom into removably covering relation to the access opening 26. In addition, due at least in part to the flexible material from which the drape 32 is formed, it may be easily positioned between completely closed position, defined by an overlying relation to an exposed face or portion of the cart 20, or a partially open position as depicted in FIG. 1. Therefore, an advantage of utilizing a drape 32 as the closure structure is that only a portion of the hollow interior within the enclosure 12 may be exposed for removal or insertion of various items or contents from or into the cart 20, as required. It is, of course, to be noted that the drape 32 may be selectively positioned into an entirely open position order to expose the entire, correspondingly positioned face or side of the cart 20, such as when the cart is being initially loaded for delivery or distribution of a plurality of different items.

In order to maintain the closure structure, such as drape 32, in a closed overlying position relative to the correspondingly disposed face or side of the cart 20, the cover assembly 10 preferably also comprises a connecting means. As shown in FIG. 2 the connecting means can include a plurality of spaced apart connectors 34 and 34' respectively secured to and along a peripheral edge of the sidewall 14 in immediately adjacent or contiguous relation to the periphery of the access opening 26, as well as on a correspondingly positioned peripheral edge or portion on the interior surface 32' of the drape 32. Such cooperative connector portions 34 and 34' may assume a variety of different structures including, but not limited to, hook and loop type fasteners, (i.e. Velcro™) snaps, zippers, etc.

The closure assembly 10 of the present invention preferably also comprises a reinforcing assembly, which may be, but does not have to be, mounted both on the exterior and interior surfaces of the enclosure 12. The purpose of the reinforcing assembly is to provide protection against physical damage to various parts of the enclosure 12; such as when it inadvertently engages a wall, door, becomes entangled with another object, surface, etc. as the cart and closure assembly 10 travel along the intended delivery or distribution route. The reinforcing assembly include a plurality of reinforced portions such as, but not limited to, corner pads 40 formed on the top 16. The corner pads 40 serve to protect the enclosure against stress or forces exerted on the cover assembly 10 in a downward direction as the top 16 is disposed in overlying, covering and at least partially engaging relation to an upper portion of the cart 20. For example, the corner pads 40 may be positioned on the top 16 so as to overly the corners of a support frame of the cart, which serve to support the enclosure 12 in the intended overlying, surrounding relation to the cart. The reinforcement assembly may comprise alternatively or in addition, a plurality of reinforced portions 42 disposed at each of the corners of the enclosures such as at the lower end of the drape 32 so as to provide reinforcing protection as well as serve as additional "weights", due to their structure. The additional weight facilitates the downwardly depending orientation of the preferred drape 32 in its intended position over the corresponding face of the cart 20 and into its closed position in covering relation to the access opening 26. As shown in FIG. 2, the reinforced portions 42 are preferably mounted on the interior surface 32' of the drape 32 adjacent certain ones of the connector components 34'. The provision of the reinforced portions 42 further serve to add protection against the pulling force exerted on the drape as it is disconnected from correspondingly positioned connector members or components 34 mounted on the exterior of the sidewall 14, as shown in FIG. 1 and discussed above. Correspondingly positioned reinforced portions 44 may also be mounted on the interior or exterior surface at the lower end of the exposed face of the sidewall 14' in which the access opening 26 is formed. These correspondingly positioned reinforce portions 44 are also provided to resist the pulling forces exerted on the sidewall segment 14', as the drape 30 is pulled into its open or at least partially open position as represented in FIG. 1.

The reinforcing assembly further includes a "bumper" type structure which may be in the form of an enlarged peripheral seam 48 secured to the top 16 but more specifically disposed in adjacent or contiguous relation to the junction of the top 16 and the sidewall 14. As best shown in FIG. 1, the protective peripheral seam 48 extends substantially continuously about the periphery of the top 16 at its junction with the sidewalls 14 and 14' and is dimensioned to extend at least partially outward from the exterior surface of both the top 16 and top regions of sidewall 14, 14' so as to protectably engage wall surfaces, doors, or any other object or surface with which the enclosure 12, when mounted on the cart 20 in its operative position, may engage during travel and/or storage of the cart 20.

With reference to FIGS. 2 through 4, 6 and 7, each of the reinforced portions, including the peripheral seam 48 as well as the other reinforced portions 40 and 42, are primarily defined by a thickened material portion, comprising at least on additional layer of material being affixed in overlying relation to a layer of material defining the corresponding portion of the enclosure 12. For example, in the sectional views of FIGS. 6 and 7, one of the corner pads 40 is defined by a thickened material portion including a layer of material representing the corner pads 40 being disposed in secured relation over (or under) the layer of material defining the top 16. Similarly in FIG. 7, the reinforced portion 42 is preferably disposed in fixed relation over the interior surface 32' of the drape 32 immediately adjacent to certain ones of the connector components 34'.

Figure 5:
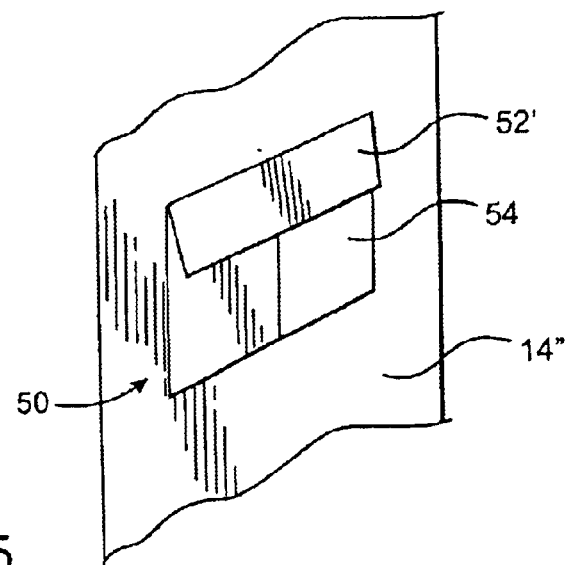
FIG. 5 is a perspective view in partial cutaway showing interior portions of a preferred cover assembly according to the present invention.
Figure 6:
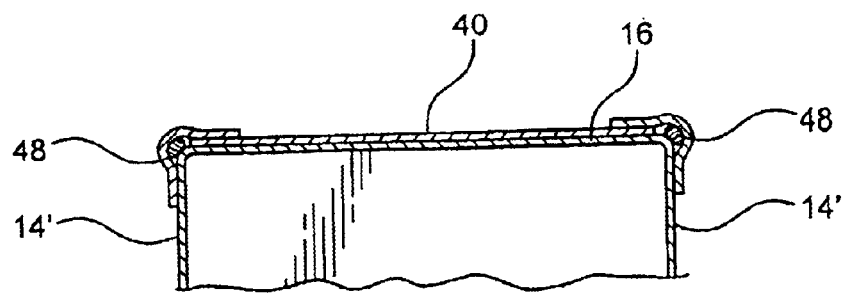
FIG. 6 is a sectional view of along line 6—6 of FIG. 3.
Figure 7:
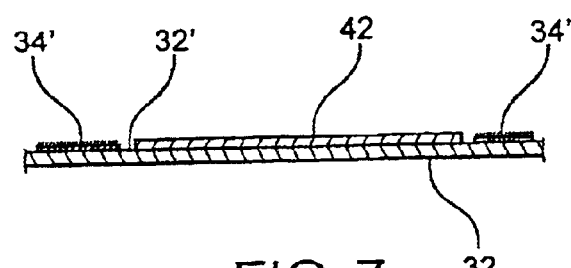
FIG. 7 is a sectional view along line 7—7 of FIG. 2.

The cover assembly 10 of the present invention preferably also comprises a storage assembly. The storage assembly includes at least a first compartment, generally indicated as 50 in FIG. 5, preferably secured to an interior surface 14" of a portion of the sidewall and therefore disposed within the hollow interior of the enclosure 12. The first compartment or pocket 50 may include a cover, as at 52, and an outer side or wall portion 54 overlying and surrounding an interior of the pocket or compartment 50 (not shown). This first pocket 50 is disposed within the hollow interior of the enclosure 12 so as to maintain specialized or predetermined garments or items in a completely isolated location, and therefore more thoroughly sterile environment, relative to the remainder of the interior of the enclosure 12 and particularly, in isolated relation to the cart 20 and the contents thereof. Further, the storage assembly of the present invention may include at least a second compartment or pocket 56 mounted on the exterior surface of the sidewall 14 and including a window as at 58 being either open or formed at least in part from a transparent material which allows viewing of the content maintained on the interior of the second pocket 56. Accordingly, documentation including, but not limited to, the intended delivery route or plurality of distribution locations of the contents of the cart for a particular day, etc. may be disposed within the interior of the second pocket 56, such that the informative indicia on the documentation can be read through the window 58. The storage assembly may further include a third pocket or compartment 60, also mounted on the exterior of the sidewall 14 and being of sufficient dimension and configuration to hold used or rejected items on the interior thereof for delivery back to the proper site for cleaning or disposal.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A cover assembly for a cart, said cover assembly comprising:
   a) an enclosure including a hollow interior dimensioned to receive the cart therein when said enclosure is disposed in an operative position,
   b) said enclosure including a top and a sidewall, said top disposed in overlying relation to an upper portion of the cart and said sidewall depending downwardly from said top in overlying, at least partially surrounding relation to a plurality of sides of the cart,
   c) an access opening formed in said sidewall in aligned relation with a corresponding side of the cart,
   d) a closure structure selectively positionable between a closed and an open position relative to said access opening,
   e) said access opening disposed and dimensioned to access contents of the cart and allow passage of the contents therethrough, when said closure is in said open position,
   f) said enclosure formed of a flexible, hypo-allergenic material selectively oriented in either said operative position or a collapsed stored position,
   g) a storage assembly including a first compartment mounted within said hollow interior of said enclosure, said first compartment disposed and structured to isolate the contents thereof from the cart and a remainder of said hollow interior of said enclosure,
   h) said first compartment further structured to maintain at least one predetermined item in a sterile environment relative to the cart and the contents thereof,
   i) said storage assembly also comprising a second compartment secured to an exterior of said enclosure and including a window formed of a transparent material therein, said window disposed in aligned relation with an interior of said second compartment to facilitate viewing of the interior of said second compartment therethrough, and
   j) said storage assembly further comprising a third compartment secured to an exterior of said enclosure and structured to hold one or more used items for delivery to a cleaning or disposal site.

2. A cover assembly as recited in claim 1 wherein said access opening is disposed in overlying alignment with at least a majority of one side of the cart.

3. A cover assembly as recited in claim 2 wherein said access opening comprises a dimension and configuration substantially corresponding to one side of the cart.

4. An assembly as recited in claim 2 wherein said closure structure comprises a flexible material drape connected in substantially depending relation to said top and in overlying, covering relation to said access opening, when said closure structure is in said closed position.

5. A cover assembly as recited in claim 4 wherein said drape is correspondingly dimensioned and configured to said access opening and disposed in overlying, covering relation to the one side of the cart when said closure structure is in said closed position.

6. A cover assembly as recited in claim 5 further comprising a connecting assembly mounted along corresponding peripheral portions of said drape and said access opening and disposed in removable interconnection between said drape and said sidewall.

7. A cover assembly as recited in claim 1 further comprising a reinforcement assembly at least partially secured to an exterior of said enclosure and structured to restrict physical damage to at least said top and said sidewall.

8. A cover assembly as recited in claim 7 wherein said reinforcement assembly comprises a plurality of reinforced portions connected to said enclosure at a plurality of spaced apart locations, at least some of said plurality of reinforced portions extending outwardly from an exterior of said enclosure.

9. A cover assembly as recited in claim 8 wherein said plurality of reinforced portions include at least one thickened material portion defined at least in part by a multi-layered construction of protective material.

10. An assembly as recited in claim 8 wherein said plurality of reinforced portions comprise a plurality of corner pads formed at least partially on said top adjacent a commonly disposed periphery of said top and sidewall.

11. An assembly as recited in claim 10 wherein said plurality of reinforced portions further comprise an elongated peripheral seam extending along an exterior of said enclosure contiguous to a commonly disposed peripheral junction between said sidewall and said top.

12. A cover assembly as recited in claim 8 wherein said plurality of reinforced portions further comprise an elongated peripheral seam extending along an exterior of said enclosure contiguous to a commonly disposed peripheral junction between said sidewall and said top.

13. A cover assembly as recited in claim 8 wherein at least one of said plurality of reinforced portions is secured on said closure structure adjacent and in reinforcing relation to a periphery of said closure structure.

14. A cover assembly designed to be removably mounted on a mobile cart, said cover assembly comprising:
   a) an enclosure including a hollow interior dimensioned to receive a cart therein when said enclosure is oriented in an operative position,
   b) said enclosure including a top and a sidewall, said top disposed in overlying relation to an upper portion of said cart and said sidewall extending downwardly from said top in overlying, at least partially surrounding relation to a plurality of sides of the cart,
   c) an access opening formed in said sidewall in aligned relation with a corresponding portion of the cart,
   d) a closure structure selectively positionable between a closed position and an open positioned relative to said access opening,
   e) said access opening disposed and dimensioned to access contents of the cart and allow passage of the contents therethrough when said closure is in said open positioned,
   f) said enclosure including an open bottom disposed at a lower end of said sidewall and dimensioned to allow a bottom of the cart to pass therethrough,
   g) a reinforcement assembly comprising a plurality of reinforced portions connected to said enclosure at a plurality of spaced apart locations,
   h) said plurality of reinforced portions comprising a plurality of corner pads disposed in overlying, at least partially covering relation to corner portions of said top,
   i) said reinforcement portions further comprising an elongated peripheral seam extending continuously along an exterior of said enclosure contiguous to a commonly exposed peripheral junction between said side wall and said top,
   j) a storage assembly including a first pocket mounted on an interior of said sidewall and structured to isolate the contents thereof from said cart when said enclosure is in said operative position,
   k) said first pocket further structured to maintain at least one predetermined item in a sterile environment relative to the cart and the contents thereof,
   l) said storage assembly also comprising a second pocket secured to an exterior of said enclosure and including a window formed therein, said window disposed in aligned relation with an interior of said second pocket to facilitate viewing of the interior of said second pocket therethrough, and
   m) said storage assembly further comprising a third pocket secured to an exterior of said enclosure and structured to hold one or more used items for delivery to a cleaning or disposal site.

15. A cover assembly as recited in claim 14 wherein said enclosure is formed of a flexible, hypo-allergenic material selectively oriented in either said operative position or a collapsed, stored position.

16. A cover assembly for a cart, said cover assembly comprising:
   a) an enclosure including a hollow interior dimensioned to receive the cart therein when said enclosure is disposed in an operative position,
   b) said enclosure including a top and a sidewall, said top disposed in overlying relation to an upper portion of the cart and said sidewall depending downwardly from said top in overlying, at least partially surrounding relation to a plurality of sides of the cart,
   c) an access opening formed in said sidewall in aligned relation with a corresponding side of the cart,
   d) a closure structure selectively positionable between a closed and an open position relative to said access opening,
   e) a storage assembly including a first compartment mounted within said hollow interior of said enclosure, said first compartment disposed and structured to isolate the contents thereof from the cart and a remainder of said hollow interior of said enclosure,
   f) said first compartment further structured to maintain at least one predetermined item in a sterile environment relative to the cart and the contents thereof,
   g) said storage assembly also comprising a second compartment secured to an exterior of said enclosure and including a window formed therein, said window disposed in aligned relation with an interior of said second compartment to facilitate viewing of the interior of said second compartment therethrough, and
   h) said storage assembly further comprising a third compartment secured to an exterior of said enclosure and structured to hold one or more used items for delivery to a cleaning or disposal site.

17. A cover assembly as recited in claim 16 wherein said enclosure is formed from a hypo-allergenic material.

18. A cover assembly for a cart, said cover assembly comprising:
   a) an enclosure including a hollow interior dimensioned to receive the cart therein when said enclosure is disposed in an operative position,
   b) said enclosure including a top and a sidewall, said top disposed in overlying relation to an upper portion of the cart and said sidewall depending downwardly from said top in overlying, at least partially surrounding relation to a plurality of sides of the cart, c) an access opening formed in said sidewall in aligned relation with a corresponding side of the cart, d) a closure structure selectively positionable between a closed and an open position relative to said access opening, e) said access opening disposed and dimensioned to access contents of the cart and allow passage of the contents therethrough, when said closure is in said open position, f) said enclosure formed of a flexible, hypo-allergenic material selectively oriented in either said operative position or a collapsed stored position, g) a storage assembly including a first compartment mounted within said hollow interior of said enclosure, said first compartment disposed and structured to isolate the contents thereof from the cart and a remainder of said hollow interior of said enclosure, h) said first compartment structured to maintain at least one predetermined item in a sterile environment relative to the cart and the contents thereof, i) said storage assembly also comprising a second compartment secured to an exterior of said enclosure and including a window formed therein, said window disposed in aligned relation with an interior of said second compartment to facilitate viewing of the interior of said second compartment therethrough, and j) said storage assembly further comprising a third compartment secured to an exterior of said enclosure and structured to hold one or more used items for delivery to a cleaning or disposal site.

* * * * *